May 12, 1931.                L. SHERMAN                1,804,440
                          CRANKLESS ENGINE
                       Filed July 30, 1929        2 Sheets-Sheet 1

INVENTOR
Thomas L. Sherman
BY Marshall & Hawley,
ATTORNEYS

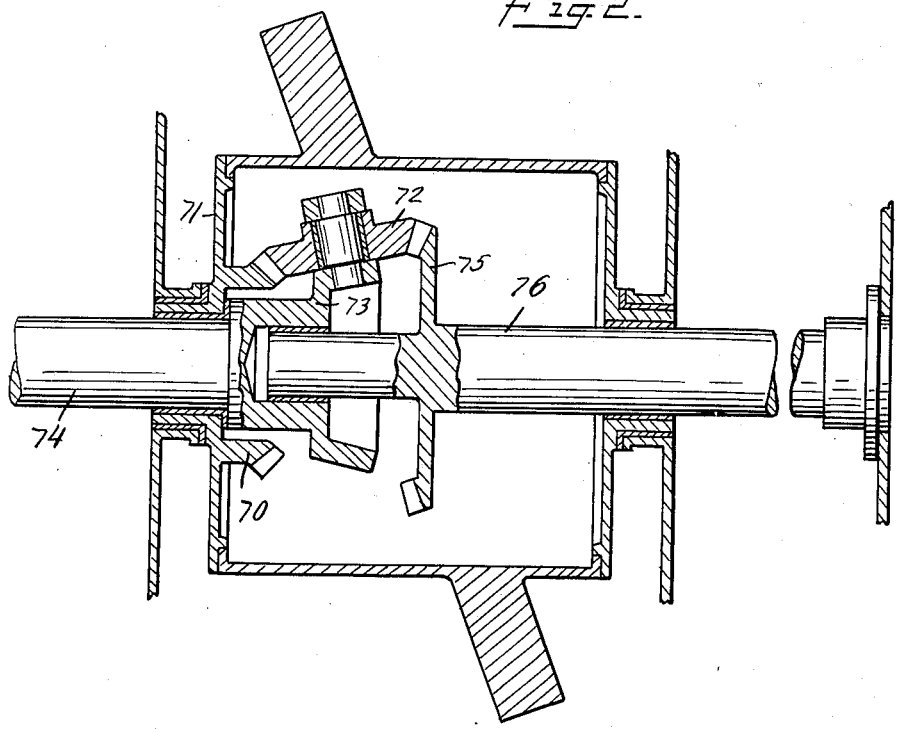

Patented May 12, 1931

1,804,440

UNITED STATES PATENT OFFICE

THOMAS L. SHERMAN, OF NEW YORK, N. Y., ASSIGNOR TO MICHELL-CRANKLESS ENGINES CORPORATION, OF NEW YORK, N. Y., A CORPORATION OF NEW YORK

CRANKLESS ENGINE

Application filed July 30, 1929. Serial No. 382,105.

This invention relates to crankless engines or to devices of this character using a swash plate to transform reciprocating motion to rotary motion.

The invention has for its object to provide a simple, compact and self contained gearing such as reduction gearing for swash plate drive mechanisms or engines.

Further objects of the invention will appear from the following specification taken in connection with the drawings which form a part of this application, and in which Fig. 1 is a sectional elevation partly broken away showing slant mechanism in combination with a reduction gearing;

Fig. 2 is a sectional elevation similar to Fig. 1 but showing a different type of reduction gearing;

Figure 1:
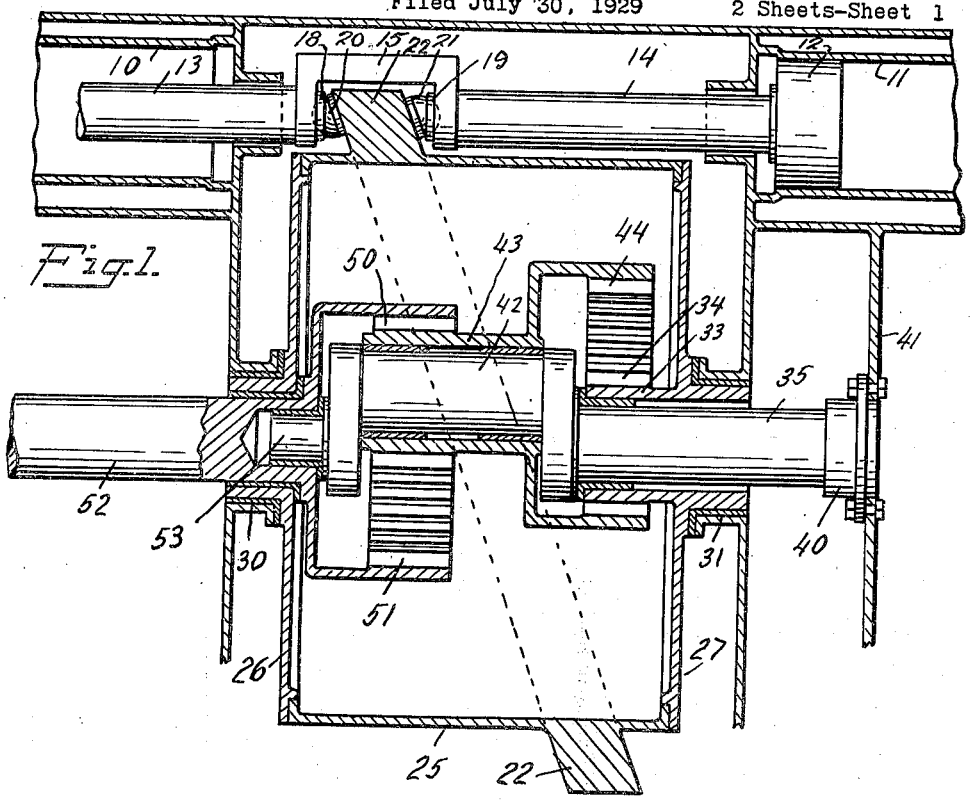

The invention briefly described consists of a swash plate mechanism such as an engine, the swash plate being associated with or formed or mounted on a housing. Gearing for transmitting the rotary motion of the swash plate to a driven shaft is disposed within the housing. In the forms of the invention illustrated one of the gear elements is connected to and is driven by the swash plate and the housing or casing and other gearing such as reduction gearing, is disposed within the housing and is driven by the gear elements and in turn drives the driven shaft. The connecting gearing is supported on a torque shaft which is disposed concentric with or in alinement with the axes of rotation of a swash plate, housing and driven shaft.

Further details of the invention will appear from the following description.

In the embodiment of the invention illustrated in Figs. 1, 2, 3, 4 and 5 there is shown a portion of a crankless engine in conjunction with a swash plate and reduction gearing driven thereby. The engine comprises a pair of cylinders 10 and 11 in which reciprocate pistons 12 to which are connected piston rods 13 and 14 which in turn are connected to each other by a yoke 15. The yoke is provided with a pair of spherical sockets 18 and 19 in which are mounted slipper pads 20 and 21 which bear against the opposite faces of a swash plate or slant 22.

The swash plate or slant 22 is secured to or formed on and extends outwardly from the periphery of the drum 25. Heads or ends 26 and 27 support the drum, the heads in turn being supported in bearings 30 and 31 formed on the frame of the engine. The head or end plate 27 has formed thereon or secured thereto an inwardly extending sleeve 33 and gear teeth are formed on or secured to the inner end of the sleeve as shown in 34.

A torque shaft 35 is mounted in and extends through the sleeve 33. The rear end of the torque shaft is fixedly mounted in a boss 40 which is secured to and carried by an anchorage plate 41. The shaft 35 has an offset portion 42 on which is mounted a sleeve 43. An internal gear 44 is formed on or secured to the sleeve 43 and meshes with the gear 34 carried by the sleeve 33. The sleeve 43 also has formed thereon or secured thereto a gear 50 which meshes with an internal gear 51 carried by the driven shaft 52. The torque shaft 35 has a reduced extension 53 mounted within the inner end of the driven shaft 52.

Attention is directed to the fact that the axis of the torque shaft, the axis of the driven shaft and the axis of rotation of the swash plate and housing are all disposed in alinement with each other, or in other words, coincide.

Figure 3:
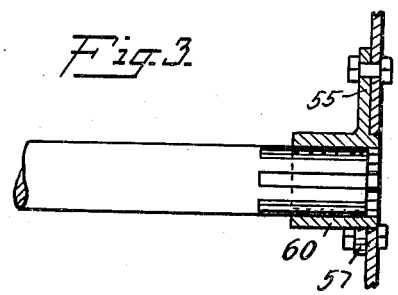
Fig. 3 is a sectional elevation showing one form of mounting for the torque shaft.
Figure 4:
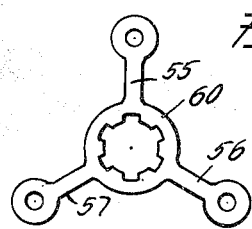
Fig. 4 is an end view of the torque shaft support shown in Fig. 3.

The anchorage plate 41 or the fixed support for the outer end of the torque shaft may be constructed in any desired manner and in Figs. 3 and 4 there is shown a spider having arms 55, 56 and 57 designed particularly to take the torque reaction. The spider has a hub 60 and as shown in Figs. 3 and 4 the end of the shaft is splined to the hub. The anchorage just described is particularly designed to prevent forced or synchronous vibration within the gearing.

Figure 5:
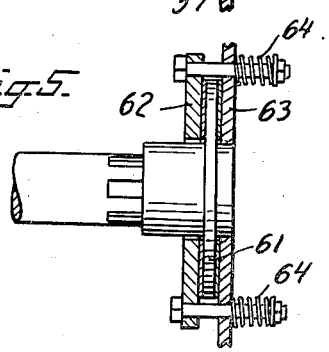
Fig. 5 is a view similar to Fig. 3 but showing a slightly different form of torque shaft mounting and support.

Fig. 5 shows a torque shaft having a disk 61 splined to the shaft and having frictional engagement with plates 62 and 63 which are fixed against rotation and are forced toward each other by means of springs 64.

The construction illustrated in Fig. 1 operates as follows: As the pistons of the engine or other mechanism are reciprocated the swash plate 22 will be rotated in the well known manner and will in turn rotate the drum 25 by which it is carried. The end plate or head 27 of the drum will drive the gear which in turn will drive the internal gear 44. The gear 50 will be driven with the internal gear 44 and will in turn rotate the internal gear 51 thus causing the rotation of the shaft 52. It should be borne in mind that the torque shaft 35 is held against rotation.

The invention is not limited to use in connection with any particular form of gearing and in Fig. 2 a bevel gear 70 is driven by the head 71 of the drum. The gear 70 meshes with a planet gear or, if desired with planet gears 72 mounted on a cage or spider 73 which is carried by and connected to the driven shaft 74. The planet gear or gears 72 also mesh with a fixed bevel gear 75 which is carried by the torque shaft 76. The torque shaft may be supported in any desired manner as in the manner shown in Figs. 3, 4 and 5.

In the form of the invention just described it will be obvious that the drive will be communicated from the swash plate housing to the bevel gear 70 and since the gear 75 is stationary the planet gear or gears will be rotated at a reduced speed and will transmit this rotation through the spider 73 to the driven shaft 74.

It will be understood that the gearing need not be connected to the driving and driven elements in the particular manner shown and described but that any desired construction and arrangement of gearing elements may be used.

From the foregoing description it will be obvious that a simple, practical and compact form of gearing connection or reduction gearing has been designed for transmitting to the driven shaft the rotational movement of the swash plate.

Although certain specific embodiments of the invention have been particularly shown and described, it will be understood that the invention is capable of further modification and that further changes in the construction and in the arrangement of the various cooperating parts may be made without departing from the spirit or scope of the invention, as expressed in the following claims.

What I claim is:

1. In a mechanism of the character described, a swash plate, a housing associated therewith and rotatable with the swash plate, and gearing within said housing including a gear element operatively connected to the housing and elements operatively driven thereby.

2. In a mechanism of the character described, a swash plate, a housing associated therewith and rotatable with the swash plate, gearing within said housing including a gear element operatively connected to the housing and elements operatively driven thereby and a shaft in said housing for supporting said driven gear elements.

3. In a mechanism of the character described, a swash plate, a housing associated therewith and rotatable with the swash plate, gearing within said housing including a gear element operatively connected to the housing and elements operatively driven thereby, and a stationary shaft in said housing for supporting said driven gear elements.

4. In a mechanism of the character described, a swash plate, a housing associated therewith and rotatable with the swash plate, gearing within said housing including a gear element operatively connected to the housing and elements operatively driven thereby, and a shaft in said housing for supporting said driven gear elements, said shaft having an axis coinciding with the axis of rotation of the swash plate and housing.

5. In a mechanism of the character described, a swash plate, a housing associated therewith and rotatable with the swash plate, gearing within said housing including a gear element operatively connected to the housing and elements operatively driven thereby, and a stationary shaft in said housing for supporting said driven gear elements, said shaft having an axis coinciding with the axis of rotation of the swash plate and housing.

6. In a mechanism of the character described, a swash plate, a housing rotatable with said plate, a gear element disposed within and driven by said housing, a shaft, and operative driving connections between said gear element and shaft.

7. In a mechanism of the character described, a swash plate, a housing rotatable with said plate, a gear element driven by said housing, a shaft, and operative driving connections, located in said housing, between said gear element and shaft.

8. In a mechanism of the character described, a swash plate, a housing rotatable with said plate, a gear element driven by said housing, a shaft having an axis coinciding with the axis of rotation of the swash plate and operative driving connections between said gear element and shaft.

9. In a mechanism of the character described, a swash plate, a casing rotatable by said plate, a gear element driven by said casing and gearing within the casing operatively connected to said gear element.

10. In a mechanism of the character described, a hollow drum, a swash plate extending outwardly therefrom, a shaft, and gearing driven by and disposed within said drum operatively connected to said shaft.

11. In a mechanism of the character described, a hollow drum, a swash plate extending outwardly therefrom, a shaft, gearing driven by and disposed within said drum operatively connected to said shaft and a shaft within said drum supporting said gearing.

12. In a mechanism of the character described, a hollow drum, a swash plate extending outwardly therefrom, a shaft, gearing driven by and disposed within said drum operatively connected to said shaft and a shaft within said drum supporting said gearing, both of said shafts being axially alined with the axis of the swash plate.

13. In a mechanism of the character described, a swash plate, a housing associated therewith and rotatable with the swash plate, gearing within said housing including a gear element operatively connected to the housing and elements operatively driven thereby, a shaft in said housing for supporting said driven gear elements, and means for supporting said shaft in a manner to resist vibration thereof.

14. In a mechanism of the character described, a swash plate, a housing associated therewith and rotatable with the swash plate, gearing within said housing including a gear element operatively connected to the housing and elements operatively driven thereby, a shaft in said housing for supporting said driven gear elements, and means for supporting said shaft in a manner to resist vibration thereof, due to torsional strains.

15. In a mechanism of the character described, a swash plate, a housing associated therewith and rotatable with the swash plate, gearing within said housing including a gear element operatively connected to the housing and elements operatively driven thereby, a shaft in said housing for supporting said driven gear elements, and supporting means for holding said shaft against forced or synchronous vibration.

16. In a mechanism of the character described, a hollow drum, a swash plate extending outwardly therefrom, a shaft, gearing driven by and disposed within said drum and operatively connected to said shaft, a shaft for supporting said gearing and means for holding said last named shaft against torsional vibration caused by the operation of said gearing.

17. In a mechanism of the character described, a swash plate, a housing rotatable therewith, a gear element driven by said housing, gearing driven by said gear element, means for supporting said gearing, and means for holding said supporting means against vibration caused by the operation of said gearing.

18. In a mechanism of the character described, a swash plate, a housing rotatable therewith, a gear element driven by said housing, gearing driven by said gear element, a shaft driven by said gearing, means for supporting said gearing, and means for holding said supporting means against vibration caused by the operation of said gearing.

THOMAS L. SHERMAN.